(No Model.)
HENRI JOSEPH ERNEST HENNEBUTTE & CHARLES JUST FÉLIX RAOUL DE JANNEL MENARD, VICOMTE DE VAURÉAL.
PROCESS OF TREATING AMMONIACAL LIQUORS.
No. 259,145.  Patented June 6, 1882.
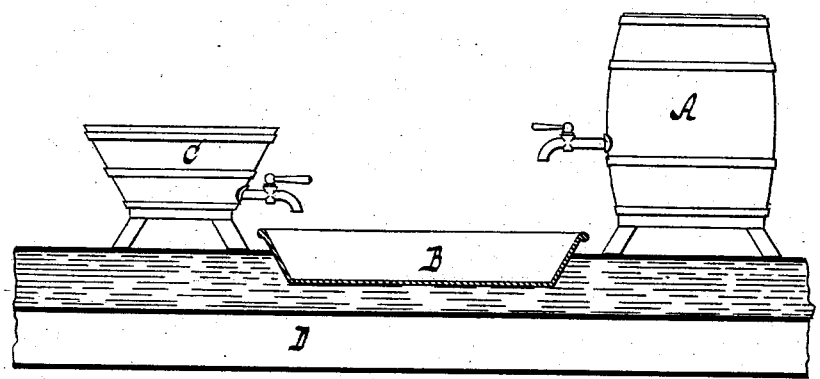

United States Patent Office.

HENRI JOSEPH ERNEST HENNEBUTTE, OF ANGLET, AND CHARLES JUST FÉLIX RAOUL DE JANNEL MENARD, VICOMTE DE VAURÉAL, OF BIARRITZ, FRANCE, ASSIGNORS TO THE SOCIÉTÉ ANONYME DES PRODUITS CHIMIQUES DU SUD-OUEST, OF PARIS, FRANCE.

PROCESS OF TREATING AMMONIACAL LIQUORS.

SPECIFICATION forming part of Letters Patent No. 259,145, dated June 6, 1882.

Application filed November 8, 1881. (No specimens.) Patented in France April 27, 1878, No. 124,137; in England October 29, 1878, No. 4,353, and July 19, 1880, No. 2,963; and in Germany May, 1879, No. 8,171.

*To all whom it may concern:*

Be it known that we, HENRI JOSEPH ERNEST HENNEBUTTE and CHARLES JUST FÉLIX RAOUL DE JANNEL MENARD, Vicomte de Vauréal, citizens of the Republic of France, residing, the former at Anglet, the latter at Biarritz, in the Department of the Basses Pyrénées and Republic of France, have invented new and useful Improvements in Process of Treating Ammoniacal Liquors, of which the following is a specification.

This invention relates to a process of treating ammoniacal liquors—such as the waste waters or sluice-waters from gas-works and other factories—to produce therefrom salts of ammonia; and it consists in exposing said waters to the action of reagents to form a soluble salt or salts of ammonia, decanting the liquor holding said salt or salts in solution, and evaporating or concentrating the same, as hereinafter more fully set forth.

The evaporation or concentration may be effected in a boiler, corrosion of which may be prevented by adding to the liquid double chloride of ammonium and lead, as hereinafter more fully described.

The methods herein set forth furnish to different works, especially gas-works, simple and economic means for the production of sulphate or muriate of ammonia, or concentrated solutions of these salts, from their waste waters or sluice-waters.

The treatment of the ammoniacal waters consists in simply fixing the ammonia and evaporating the liquid. The apparatus used is shown in the annexed drawing. The ammoniacal sluice-waters are led into an open wooden barrel, A, or other suitable receptacle of a capacity corresponding to the capacity of the works. The barrel is provided with a wooden faucet at about one-third of its height from the bottom of the barrel. To the ammoniacal liquid in this receptacle is added a reagent in quantities proportioned to the richness of the ammoniacal liquors operated on. If the result desired is to obtain sulphate of ammonia, or concentrated solutions of sulphate of ammonia, the reagent employed is sulphate of alumina, either pure or impure. Crude sulphate of alumina—known in England as "alum cake"—is thoroughly fit for this purpose. If, on the contrary, it is desired to produce chlorhydrate of ammonia or concentrated solutions of chlorhydrate of ammonia, the reagent to be employed will be a mixture of the chlorides of calcium and iron. This last reagent can be economically obtained without the employment of heat by the following process: In an earthen vessel chlorhydric acid of about 20° or 22° Baumé is caused to react on iron ore of a susceptible nature and which has been previously reduced to powder. At the close of twenty-four hours the liquid—which is a mixture of chloride of iron and, for a large part, of free chlorhydric acid—is decanted into a second receptacle, where the neutralization is effected by pieces of carbonate of lime. The result of the operation is a mixture of the chlorides of calcium and iron of from 40° to 42° Baumé. The mixed chlorides of calcium and iron (mixture of chloride of calcium and of chloride of iron) can be obtained by the action upon iron of chlorhydric acid, which action is made to take place, so that at least two-thirds of the acid employed remains free, this excess of acid being then saturated by carbonate of lime. Industrially, two superposed batteries are formed, consisting of jars of stone or earthenware. The receivers of the upper battery contain iron waste; those of the lower battery carbonate of lime. The chlorhydric acid is led into the first receivers, where it is allowed to remain for some hours. Then the liquid resulting from this first operation, and which is a mixture of chloride of iron and of free acid, is led into the carbonate of lime for complete saturation of the excess of acid. The final product of these two successive operations is a solution of about 40° Baumé, the condition of which is very favorable as well for economy of transportation as for the special use for which it is destined.

In order that the desulphuration of the ammoniacal waters from the gas may take place under favorable conditions, it suffices that the reagent in question contains from twenty-five to thirty-three per cent. of chloride of iron, and in this estimation the proportion of lime of the chlorides may vary without inconvenience—that is to say, that the reagent may show from twenty-five to thirty-three per cent. chloride of iron and sixty-six to seventy-five per cent. of chloride of calcium. As shown, the mixture of chloride of calcium and of iron is thus obtained industrially by the incomplete attack of the iron, followed by a saturation of the excess of free acid by the carbonate of lime.

The reaction of the sulphate of alumina upon the ammoniacal sluice-water takes place as follows: The ammoniacal salts which the water contains react on the sulphate of alumina to form sulphate of ammonia in solution, while carbonic and sulphhydric acids are set free and a copious precipitate of hydrate of alumina is formed, which purifies the sluice-water by carrying with it tarry matter. As to the employment of the mixed chlorides of iron and calcium, it gives rise to this other reaction: The chloride of calcium is decomposed by the sesquicarbonate of ammonia of the sluice-water into carbonate of lime, which precipitates, and a chlorhydrate of ammonia, which rests in solution in the liquor. The chloride of iron is attacked at the same time by the sesquicarbonate and sulphhydrate of ammonia to form chlorhydrate of ammonia in solution and sulphide of iron, as well as hydrate of iron, which settle. After standing for twenty-four hours the wooden barrel contains a precipitate covered by a limpid liquor which contains sulphate or muriate of ammonia, according to the nature of the reagent employed. This liquor, which is decanted in opening the wooden faucet with which the barrel is provided, is evaporated to the degree desired either in a flat sheet-metal vessel, which is placed upon furnaces, or in a small sheet-metal vessel, B, placed on the blast-chimney D of the works, or in a sheet-metal vessel heated directly by a fire, if the works have not sufficiently utilizable spent heat.

The concentrated solutions of sulphate or muriate of ammonia are disposed of in a similar manner as at ammoniacal-salt factories, unless it should be desired to continue the concentration further and crystallize the solutions by exposure to cold. From these salts it is also possible to obtain ammonia by processes well known.

The concentration in sheet-metal vessels of the liquid containing muriate of ammonia is rendered possible by adding to the solution in the sheet-metal vessel a small quantity of double chloride of ammonium and lead. This mixed chloride may be kept ready for use in the vessel C, provided with a faucet. The object of this double chloride is to preserve the sheet-metal vessel or boiler against the action of the chloride of ammonium (muriate of ammonia) by causing to be deposited on the walls of the boiler a galvanic layer or lining of free or metallic lead.

What we claim as new, and desire to secure by Letters Patent, is—

1. The herein-described process of treating ammoniacal liquors by exposing said liquors to the action of the mixed chlorides of calcium and iron, decanting or collecting the resulting liquor, and evaporating or concentrating the same, substantially as and for the purpose set forth.

2. The herein-described process of treating ammoniacal liquors by exposing said liquors to the action of reagents, forming a soluble salt or salts of ammonia, decanting or collecting the liquor holding said salt or salts in solution, and evaporating or concentrating the same in a sheet-metal vessel or boiler in the presence of mixed chlorides of ammonium and lead, substantially as and for the purpose described.

In testimony whereof we have hereunto set our hands and seals in the presence of two subscribing witnesses.

HENRI JOSEPH ERNEST HENNEBUTTE. [L. S.]
CHARLES JUST FÉLIX RAOUL DE JANNEL MENARD,
VICOMTE DE VAURÉAL. [L. S.]

Witnesses:
RENÉ FRANC,
ELYSÉE LÉON.